UNITED STATES PATENT OFFICE.

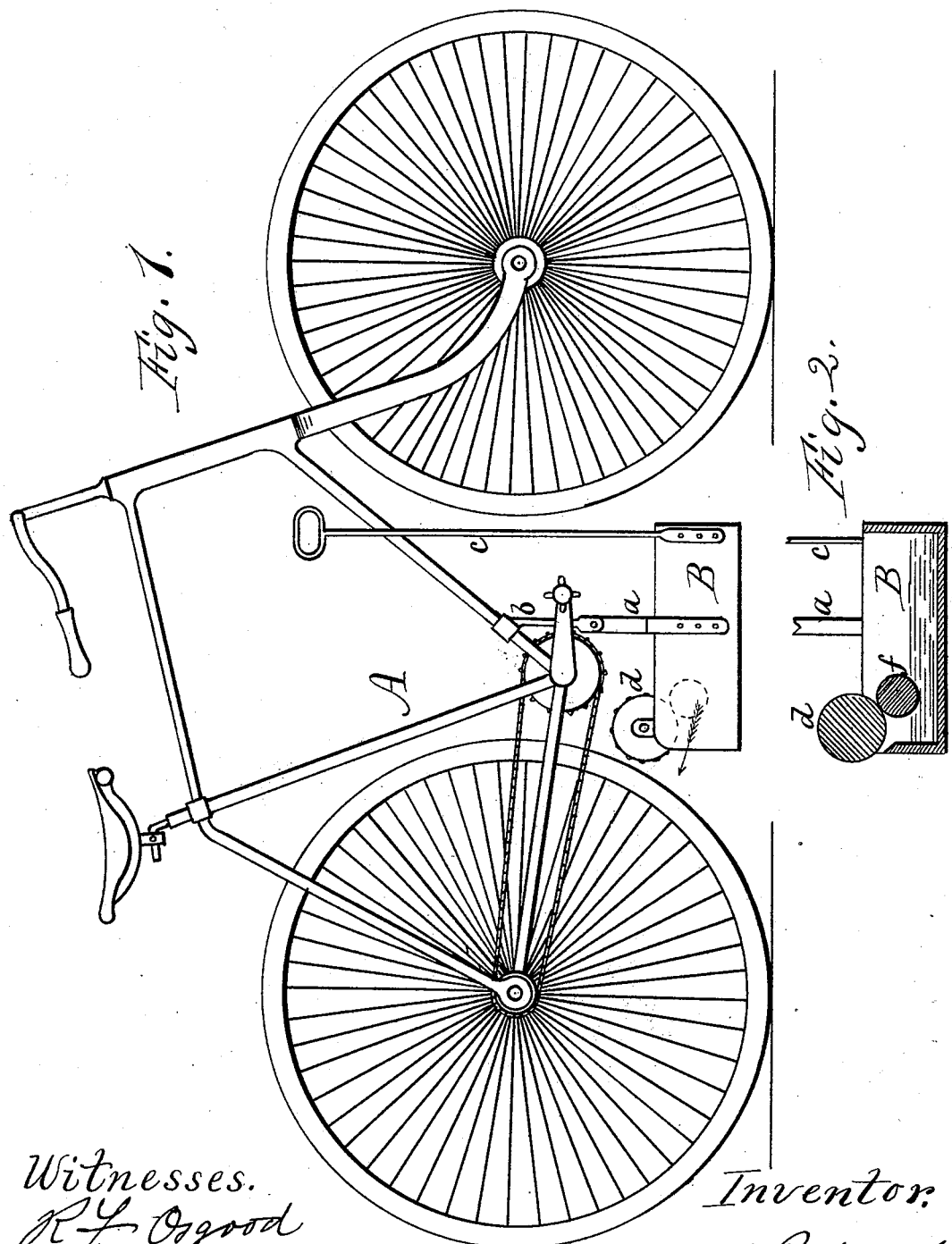

EDMOND REDMOND, OF ROCHESTER, NEW YORK.

PRINTING ATTACHMENT FOR BICYCLES.

SPECIFICATION forming part of Letters Patent No. 520,803, dated June 5, 1894.

Application filed November 27, 1893. Serial No. 492,193. (No model.)

*To all whom it may concern:*

Be it known that I, EDMOND REDMOND, of Rochester, in the county of Monroe and State of New York, have invented a new and useful Improvement in Printing Attachments for Bicycles for Printing on Sidewalks, &c., of which the following is a specification.

The improvement relates to printing words or short sentences on walks or pavements. Heretofore printing on walks was done by a stencil and brush in the hands of the operator.

The improvement consists in applying an attachment to a bicycle through the operation of which, in combination with the action of the bicycle in its progress, letters or figures can be printed in ink or paint on a sidewalk or pavement. I attain the object by the mechanism illustrated in the accompanying drawings, in which—

Figure 1 is an elevation of the apparatus in combination with a bicycle. Fig. 2 is a section of the apparatus.

The ink fountain B is attached to the frame of the bicycle A by the suspending arm $b$, $a$ in which there is a joint that allows the fountain B to be moved to or from the rear wheel of the bicycle by the handle $c$. When the handle $c$ is pressed down it puts the roller $d$, on the face of which are raised letters, in contact with the face of the rear bicycle wheel which causes the rollers $d$ and $f$ to revolve and carries the ink, in which the roller $f$ is partially immersed, to the face of the bicycle wheel which will imprint, where it treads, any words that were marked on it by the lettering roller $d$. If desirable, words in raised or depressed letters can be made on the face of the bicycle tire and a smooth-faced roller $d$ be employed to ink it; the effect being, as the bicycle goes forward, to print on the sidewalk any words that are made on the bicycle tire, a pneumatic tire being preferable.

Having fully described my invention, what I claim, and desire to secure by Letters Patent, is—

1. The combination, with a bicycle of an ink fountain, attached to the frame of the bicycle, and means by which the ink from the fountain is conveyed to the bicycle tire, substantially as described.

2. The combination with a bicycle frame and the wheels thereof of an inking apparatus attached to the frame, and means substantially as described controlled by the rider, whereby the inking apparatus can be thrown into and out of contact with one of the wheels, as set forth.

3. The combination with a bicycle of the reservoir B, flexible suspending arm $a$, $b$, inking wheels $d$ $f$ and lever $c$.

4. An inking apparatus for bicycles consisting of the fountain B, the rollers $d$, $f$, the flexible suspending arm $a$, $b$, provided with means whereby the apparatus can be attached to a bicycle frame, and the operating handle $c$, all substantially as described and for the purpose set forth.

EDMOND REDMOND.

Witnesses:
OWEN REDMOND,
EDWARD M. REDMOND.